(12) United States Patent
Overton et al.

(10) Patent No.: US 7,515,795 B2
(45) Date of Patent: Apr. 7, 2009

(54) WATER-SWELLABLE TAPE, ADHESIVE-BACKED FOR COUPLING WHEN USED INSIDE A BUFFER TUBE

(75) Inventors: Bob Overton, Lenoir, NC (US); Wayne Cheatle, Hickory, NC (US); Greg Dechristopher, Hickory, NC (US)

(73) Assignee: Draka Comteq B.V., Amsterdam (NL)

( * ) Notice: Subject to any disclaimer, the term of this patent is extended or adjusted under 35 U.S.C. 154(b) by 207 days.

(21) Appl. No.: 11/424,112

(22) Filed: Jun. 14, 2006

(65) Prior Publication Data

US 2007/0019915 A1 Jan. 25, 2007

Related U.S. Application Data

(60) Provisional application No. 60/700,739, filed on Jul. 20, 2005, provisional application No. 60/710,654, filed on Aug. 24, 2005, provisional application No. 60/764,776, filed on Feb. 3, 2006.

(51) Int. Cl.
*G02B 6/44* (2006.01)
(52) U.S. Cl. .................... 385/100; 385/102; 385/109
(58) Field of Classification Search .................. None
See application file for complete search history.

(56) References Cited

U.S. PATENT DOCUMENTS

| | | | |
|---|---|---|---|
| 4,366,206 A | 12/1982 | Tanaka | |
| 4,703,998 A | 11/1987 | Uchioke et al. | |
| 4,909,592 A | 3/1990 | Arroyo et al. | |
| 5,109,457 A | 4/1992 | Panuska et al. | |
| 5,138,685 A | 8/1992 | Arroyo et al. | |
| 5,369,720 A | 11/1994 | Parry et al. | |
| 5,925,461 A | 7/1999 | Fairgrieve | |
| 6,226,431 B1 | 5/2001 | Brown et al. | |
| 6,253,012 B1 | 6/2001 | Keller et al. | |
| 6,278,826 B1 | 8/2001 | Sheu | |
| 6,284,367 B1 | 9/2001 | Gruhn et al. | |
| 6,504,979 B1 | 1/2003 | Norris et al. | |
| 6,504,980 B1 * | 1/2003 | Gaillard et al. | 385/112 |

(Continued)

FOREIGN PATENT DOCUMENTS

EP 0373846 A2 6/1990

(Continued)

OTHER PUBLICATIONS

European Search Report in corresponding European Application No. 06014897, dated Mar. 9, 2007.

(Continued)

*Primary Examiner*—Sung H Pak
(74) *Attorney, Agent, or Firm*—Summa, Additon & Ashe, P.A.

(57) ABSTRACT

A water-swellable material is included for water-blocking inside a buffer tube in a cable design, and an adhesive material is provided in or on the water-swellable material. The adhesive material may function as a bonding agent between the water-swellable material and the inside wall of a buffer tube, thus providing coupling of the water-swellable material to the buffer tube. In addition, or alternatively, a second adhesive material may be provided for bonding the optical fibers to the water-swellable material. The adhesive materials may be in the form of a bead or beads and may be foamed or unfoamed.

84 Claims, 4 Drawing Sheets

U.S. PATENT DOCUMENTS

| | | |
|---|---|---|
| 6,631,229 B1 | 10/2003 | Norris et al. |
| 6,633,709 B2 | 10/2003 | Van Vickle et al. |
| 6,654,526 B2 | 11/2003 | Nechitailo et al. |
| 6,749,446 B2 | 6/2004 | Nechitailo |
| 6,760,523 B2 | 7/2004 | Nechitailo |
| 6,778,745 B2 | 8/2004 | Debban, Jr. et al. |
| 6,899,776 B2 | 5/2005 | Bahlmann et al. |
| 6,934,452 B2 | 8/2005 | Bocanegra et al. |
| 6,970,629 B2 | 11/2005 | Lail et al. |
| 7,006,740 B1 | 2/2006 | Parris |
| 7,177,507 B2 | 2/2007 | Parsons et al. |
| 7,231,119 B2 | 6/2007 | Rhoney et al. |
| 7,254,302 B2 | 8/2007 | Parsons et al. |
| 7,254,303 B2 | 8/2007 | Parsons |
| 7,277,615 B2 | 10/2007 | Greenwood et al. |
| 7,336,873 B2 | 2/2008 | Lail et al. |
| 2002/0154873 A1 | 10/2002 | Sheu |
| 2004/0120662 A1 | 6/2004 | Lail et al. |
| 2004/0120663 A1 | 6/2004 | Lail et al. |
| 2004/0208462 A1 | 10/2004 | Parsons et al. |
| 2004/0223707 A1 | 11/2004 | Parsons et al. |
| 2004/0240808 A1 | 12/2004 | Rhoney et al. |
| 2005/0180704 A1* | 8/2005 | Terry et al. .................. 385/100 |
| 2005/0213902 A1 | 9/2005 | Parsons |
| 2007/0019915 A1 | 1/2007 | Overton et al. |
| 2007/0297730 A1 | 12/2007 | Bringuier et al. |

FOREIGN PATENT DOCUMENTS

| | | |
|---|---|---|
| EP | 0482703 A1 | 4/1992 |
| EP | 1746447 A2 | 2/2007 |
| EP | 1818704 A2 | 8/2007 |

OTHER PUBLICATIONS

U.S. Appl. No. 60/700,739, filed Jul. 20, 2005 [Parent of present application].

U.S. Appl. No. 60/710,654, filed Aug. 24, 2005 [Parent of present application].

U.S. Appl. No. 60/764,776, filed Feb. 3, 2006 [Parent of present application].

* cited by examiner

WATER-SWELLABLE TAPE, ADHESIVE-BACKED FOR COUPLING WHEN USED INSIDE A BUFFER TUBE

CROSS-REFERENCES TO RELATED APPLICATIONS

This application claims the benefit of U.S. Provisional Application No. 60/700,739, filed Jul. 20, 2005, U.S. Provisional Application No. 60/710,654, filed Aug. 24, 2005, and U.S. Provisional Application No. 60/764,776, filed Feb. 3, 2006.

BACKGROUND OF THE INVENTION

1. Field of the Invention

A cable that includes a water-swellable tape or yarn, used for water-blocking inside a buffer tube in the cable design, and that includes an adhesive material for bonding the tape or yarn to the optical fibers and/or the buffer tube.

2. Background

Water blocking, petroleum-based filling gel in optical fiber buffer tubes and cable serves two purposes: 1) by completely filling all of the free space inside a buffer tube containing an optical fiber or fiber bundle, it blocks the ingress of water into the cable; and 2) being a thixotropic material, it mechanically couples the fiber or fiber bundle to the buffer tube and prevents the optical fiber or fiber bundle from pulling back inside the buffer tube as the buffer tube is processed, as the cable is installed, handled, or as the cable is subjected to thermally-induced dimensional changes due to environmental exposure. A totally dry cable eliminates the filling gel from inside a buffer tube, whether loose tube fiber or a ribbon cable. In a totally dry cable, filling gel may be replaced by a water-swellable element, which may be a tape or a yarn carrying a water-swellable material. The water-swellable element may not provide for sufficient coupling of the optical fiber or ribbon to the buffer tube, thus allowing the fiber or ribbon to pull back inside the tube/cable when the cable is installed or exposed to temperature extremes.

U.S. Pat. No. 6,970,629 and U.S. Patent Publication No. 2005/0213902 disclose adhesively attaching a water-swellable element (or dry insert) to a buffer tube. Although this may assist in preventing the fibers or ribbons from retracting with respect to the buffer tube, it introduces its own problem in the manufacturing of the cable. More specifically, it is preferable that the water-swellable element have the ability to move with respect to the buffer tube prior to and during cooling of the buffer tube, so that the fibers or ribbons do not experience a column-like bending when the buffer tube contracts during the cooling. Such bending of the fibers or ribbons may result in optical signal losses, because the fibers or ribbons may touch the inside wall of the buffer tube.

Indeed, it is common to tension the fibers or ribbons to induce a positive strain during the buffer tube extrusion process. In this manner, when the buffer tube material contracts on cooling, the positive strain in the optical fibers or ribbons compensates for some of the buffer tube contraction before the fibers or ribbons begin to absorb the contraction by the column-like bending.

SUMMARY OF THE INVENTION

A buffer tube arrangement, comprising a plurality of optical fibers; a buffer tube enclosing said optical fibers; a water-swellable element, made of, for example, tape or yarn, disposed between the optical fibers and the buffer tube, and a curable (e.g., a chemically cross-linking) adhesive material provided on the water-swellable element for bonding the water-swellable element to the buffer tube. The curable adhesive material may be, for example, a thermally curable material, such as, for example, a two-component silicone, or a radiation-curable material, such as, for example, a silicone acrylate cross-linked by exposure to actinic radiation.

The optical fibers may be, for example, formed into ribbons of from 2 to 24 or more fibers held together in a planar configuration by the application of a thin overcoat, or matrix, of UV curable material. Thus, in the buffer tube, fibers may be bundled as a ribbon stack, or they may be individually helically wound around each other. Alternatively, the fibers may be loosely disposed.

In addition, the buffer tube arrangement can include an additional adhesive material that bonds the optical fibers to the water-swellable material.

BRIEF DESCRIPTION OF THE DRAWINGS

The cables and buffer tube arrangements will be understood and appreciated more fully from the following detailed description, taken in conjunction with the non-limiting drawings, in which.

DETAILED DESCRIPTION OF THE INVENTION

Figure 1:
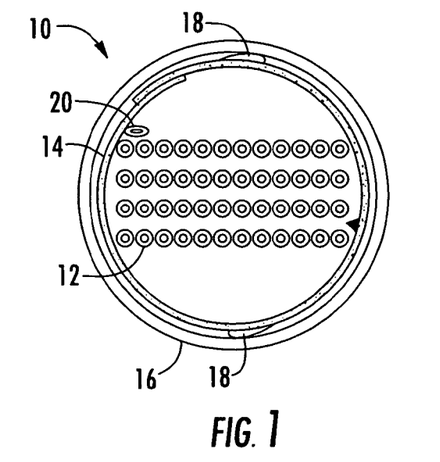
FIG. 1 is a sectional view of an embodiment of a first aspect of the cables.

FIG. 1 illustrates an embodiment of a first aspect of the cables, wherein a buffer tube arrangement 10 includes a plurality of optical fibers 12 arranged in a bundle, a water-swellable element 14 disposed around the bundle of optical fibers 12, a buffer tube 16 in which the optical fibers 12 and water-swellable element 14 are enclosed, a curable adhesive material 18 for bonding the water-swellable element to the buffer tube, and an adhesive material 20 for bonding the optical fiber bundle 12 to the water-swellable element 14.

As previously noted, although FIG. 1 illustrates the optical fibers bundled together as a ribbon stack, the optical fibers may alternatively be, for example, loosely disposed or helically wound around each other.

The water-swellable element 14 may include a water-swellable tape or yarn that carries or contains a water-swellable powder. The water-swellable powder may be applied to both sides of the water-swellable element, or it may be applied to only one side. In certain embodiments, water-swellable element 14 may include two layers, and the water-swellable powder may be applied between the two layers sandwiched together.

The composition of the water-swellable tape or yarn is not particularly limited. An example tape or yarn may be made of a material which includes a polyester, such as, for example, an inexpensive, strong and light-weight polyester carrier material within which particles or coatings of sodium polyacrylate are affixed. Examples tapes may also be spun-bonded filaments of polyester, although other materials are sometimes used, such as, for example, polypropylene. Other examples of water-swellable tape that can be used in the cables are found in U.S. Pat. Nos. 4,909,592, 6,284,367, and 6,899,776. Examples of utilizing water-swellable yarns in the cables, including a plurality (e.g., four) of 1500 denier water-swellable yarns, may be found in U.S. Pat. Nos. 4,703,998, 6,633,709 and 6,654,526.

The composition of buffer tube 16 is also not particularly limited and may include, for example, a polypropylene, a polyethylene, or a polybutylene terephthalate.

The compositions of buffer tube 16 and water-swellable element 14 may be such that the two do not sufficiently bond together through normal bonding mechanisms, such as, for example, melt-bonding (diffusion mechanism), Van der Waal's forces or hydrogen bonding (electrostatic mechanisms), surface energy interactions, other electrostatic mechanisms, etc. This may be the case when, for example, a polyester-based water-swellable element 14 is used together with a buffer tube 16 made of a polypropylene.

Depending on the materials chosen for the compositions of buffer tube 16 and water-swellable element 14, a slight amount of mechanical coupling between buffer tube 16 and water-swellable element 14 may occur due to fibrils of the water-swellable element becoming embedded in the inner wall of the buffer tube, for example, during cooling of the buffer tube. This type of mechanical coupling may be minimized or maximized by design, and if minimized, may be unreliable to ensure sufficient coupling forces between the optical fibers and the buffer tube 16. For example, if the cable during installation is overly jostled or otherwise roughed up, a polyester-based water-swellable element, which merely has fibers thereof embedded in a buffer tube inner wall, may be pulled apart from a buffer tube made of a material including polypropylene.

Thus, using a tape or yarn to water-block inside a buffer tube 16 may dramatically reduce coupling forces between the optical fiber bundle 12 (e.g., optical fiber ribbons) and the buffer tube 16, by relying mainly on friction between the fiber bundle, the tape or yarn and the buffer tube.

Figure 2:
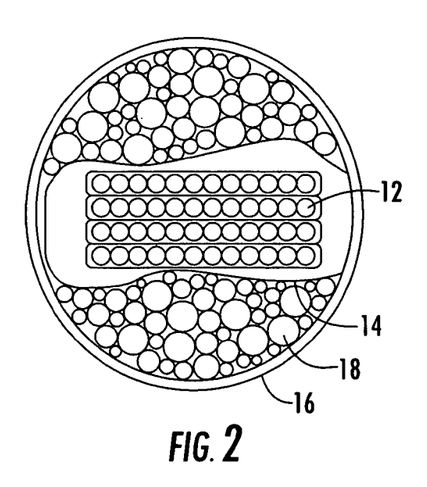
FIG. 2 is a sectional view of another embodiment of a first aspect of the cables.

Therefore, a curable adhesive material 18 may be provided on the surface of or embedded in the tape or yarn to bond the water-swellable element 14 to the buffer tube 16 upon curing. The curable adhesive material 18 may be, for example, a thermally-curable material or a radiation-curable material and can be applied in an unfoamed state as shown in FIG. 1 or a foamed state as shown in FIG. 2. Although an adhesive material 20 for bonding the optical fiber bundle 12 to the water-swellable element 14 is not illustrated in FIG. 2, embodiments of the first aspect of the cables wherein curable adhesive material 18 is in a foamed state may also include the adhesive material 20.

Foaming may reduce stress on components of the cable, including the optical fibers, by allowing the buffer tube extrusion process to push the foamed curable adhesive thoroughly around the water-swellable element without deformation of the buffer tube. Also, the linear stresses that can build in the optical fibers (e.g., the ribbon) due to temperature changes and differential thermal contraction between the curable adhesive material and the ribbons are reduced due to the foam structure. A foamed curable adhesive material may be closed-cell in nature.

Application of curable adhesive material 18 in a foamed state may effectively block water between water-swellable element 14 and the buffer tube wall, while the water-swellable element may effectively block the interstice between itself and the ribbons.

An example of a thermally curing material which may be used as curable adhesive material 18 is a two-part, room temperature vulcanizing (RTV) silicone, such as GE RTV615, that may be foamed before application in the buffer tube. Another example is a RTV silicone that is self-foaming a few seconds after application, such as, for example, Dow Corning's 3-8159 RF silicone foam. Another example is a two-part urethane, which also may be foamed during mixing or that can be formulated to self-foam during the curing process. Examples of the latter are Reoflex urethane rubbers sold by Smooth-On Corp. These types of materials can also be formulated with a very low modulus that does not change substantially with temperature excursions normally encountered in the environments in which optical fiber cables may be deployed.

Examples of radiation-curable materials include Shin-Etsu's OF212 or OF207 radiation-curable silicone acrylate, and DSM Desotech's 3471-1-135 radiation-curable urethane acrylate. Materials such as these examples are numerous, and are fast-curing with applied actinic radiation and typically a low Young's modulus to minimize stress on the optical fibers or fiber bundles.

The method for applying the curable adhesive material 18 is not particularly limited. For example, curable adhesive material 18 may be applied as a continuous bead or an intermittent bead. Also, a plurality of beads (e.g., two beads (intermittent or continuous) a certain number of degrees apart, such as 180° apart) may be applied.

The curable adhesive material 18 may be applied to the outside of the wrapped water-swellable element 14 (containing the optical fibers or ribbon stack on the inside), for example, just before entering the extruder for the buffer tube. The curable adhesive material 18 may still be liquid for the rest of the buffer tube application process, allowing the water swellable element 14 and the optical fibers to remain together in sync, moving at the same rate, all the way to the take-up reel.

After the buffer tube application process, the curable adhesive material 18 may be completely cured, forming a bond between the buffer tube and the water-swellable element wrapped around the optical fibers. For example, curing of adhesive material 18 may be designed to take place after the buffer tube has cooled to a predetermined degree or at a predetermined time after extruding the buffer tube.

The application arrangement of curable adhesive 18 may be adjusted to provide the degree of bonding required. In this regard, the adhesive bond provided by curable adhesive 18 preferably should be such that it is possible to cut the buffer tube 16 near an end and pull it off over the water swellable element 14 with relative ease. On the other hand, the bonding provided by curable adhesive 18 preferably should provide for coupling of the water-swellable element 14 to the buffer tube 16 for successful handling/installation of the cable without the fibers or ribbons in the buffer tube retracting within the cable.

An advantage of using a curable adhesive material is that a tension can be applied to both the water-swellable material 14 and the optical fibers during the buffering process, providing the water-swellable material the ability to move with respect to the buffer tube prior to the curing of the adhesive material.

As noted above, the ability to subject the optical fibers and water-swellable material to tension is beneficial in certain manufacturing methods. More specifically, it may be necessary to limit the excess length of the fibers inside the buffer tube in order to minimize any optical signal losses caused by contact stresses between the fibers and the inside wall of the buffer tube. The excess length is generated when the thermoplastic buffer tube contracts linearly on cooling following extrusion, while the fibers do not contract. To limit the excess length, it is common to tension the fibers at payoff and the buffer tube with fibers in it after the coupling point to induce a positive strain during the buffer tube extrusion process. Then, when the buffer tube material contracts on cooling, the positive strain in the optical fibers compensates for some of the buffer tube contraction before the fibers begin to absorb the contraction by controlled buckling. The water-swellable element 14 can also be subjected to a strain to prevent wrinkling or bunching of the water-swellable element when the buffer tube contracts on cooling.

The buffer tube arrangements described herein may allow for the elimination of the filling gel, while still providing a desirable coupling profile between the water-swellable element and the buffer tube. It also utilizes a cured adhesion, rather than friction, to guarantee coupling even in short sections of cable. The efficacy of the friction approach is questionable. The achievement of sufficient frictional force between the contents of the buffer tube and the buffer tube wall may be detrimental to the optical performance of the fibers.

An adhesive material 20 may be used to bond the optical fiber bundle 12 to the water-swellable element 14. For example, the adhesive material 20 may be applied during the buffer tube application process as a single bead or a plurality of beads from a fixed head positioned directly over the optical fibers between the die controlling the positioning of the fibers and the water-swellable element applicator. In other embodiments, adhesive material 20 may be embedded in water-swellable element 14 in a manner that will permit it to bond water-swellable element 14 to the optical fibers.

The die here may be an apparatus that positions the optical fibers (e.g., arranges all the ribbons together into a stack). The die and ribbon payoffs may be in a "tree" that rotates while everything else is fixed. Thus, the ribbon stack may be twisted helically as it is fed into the buffer tube extruder head. Accordingly, a bead of adhesive material 20 may in effect spiral around the ribbon stack, passing over the corners and over each side of the stack before the water-swellable tape is applied. Alternatively, the bead applicator may be mounted on a rotating fixture such that the bead or beads may be applied only onto the corners of the ribbon stack, or onto the top and bottom of the ribbon stack, or only onto the sides of the ribbon stack.

The particular application arrangement of adhesive material 20 is not intended to be limited to a single bead. For example, two beads positioned a certain number of degrees apart, such as, for example, 180° apart, may be applied to help keep the stack better centered and well-cushioned against contact with the water-swellable element and buffer tube wall and to maintain stack integrity. The adhesive material 20 may also be applied as a film directly onto the water-swellable tape before it is wrapped around the ribbon stack. Other shapes and numbers of adhesive beads may be utilized as well. In every case, the intention is to couple the ribbon stack to the water-swellable tape through the use of the adhesive.

Advantageously, the adhesive may be foamed to further reduce the modulus of the material. The degree of foaming, measured by percent reduction in adhesive density from the fully non-foamed state, may be, for example, from 1% to 95%. More preferably, the degree of foaming may be 20% to 80%. Most preferably, the degree of foaming may be from 40% to 60%. The foamed adhesive material may fill from 1% to virtually 100% of the free space inside the water-swellable element, more preferably from 1% to 50% of the free space, most preferably from 1% to 20% of the free space.

The composition of adhesive material 20 is not particularly limited. It may include a hot melt adhesive, such as, for example, an ethylene-vinyl acetate, an ethylene-butyl acetate, or an ethylene-ethyl acetate, or it may include styrene-butadiene block copolymer blends with oils, thermoplastic urethane, or a polyvinyl butyral. Adhesive material 20 may even include a polypropylene or another polyolefin.

For example, adhesive material 20 may include a block copolymer of styrene end-blocks with a butylene or an ethylene-butylene mid-block. The styrene end-blocks on the molecules may associate as the rubber in the blend cools, forming pseudo-crosslinks and giving the blend the characteristics of a cross-linked solid while remaining soft through a broad temperature range. An example of such an adhesive is MA-145 sold by Master Adhesive.

Adhesive material 20 may also be a curing material, such as, for example, any of the radiation-curable materials or thermally curing materials discussed above with respect to curable adhesive material 18.

According to the first aspect of the cables, a curable adhesive material 18 and adhesive material 20 are used to bond the water-swellable element 14 to the buffer tube 16 and the optical fiber bundle 12 to the water-swellable element 14, respectively. However, the cables are not limited to this particular aspect.

Figure 3:
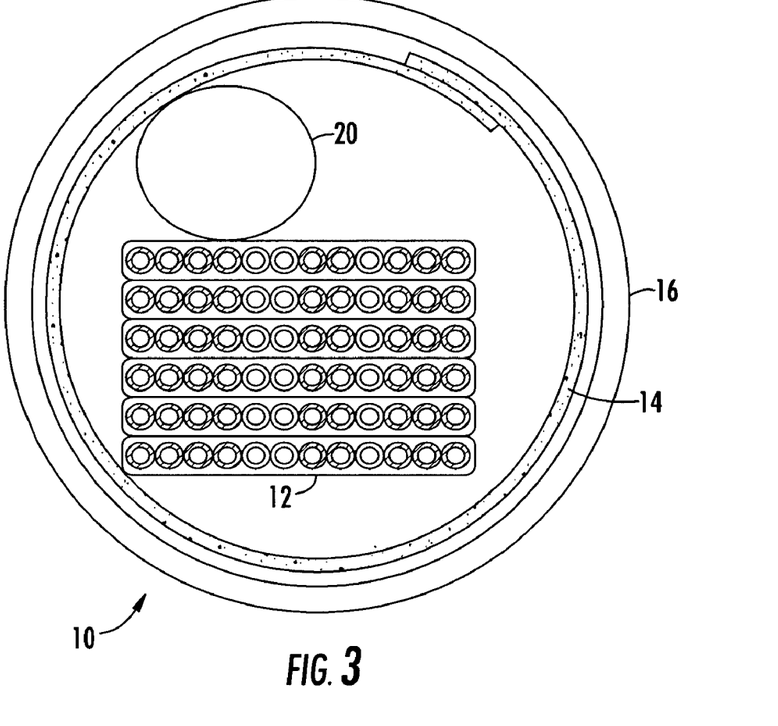
FIG. 3 is a sectional view of an embodiment of a second aspect of the cables.

For example, according to a second aspect of the cables, an embodiment of which is shown in FIG. 3, cables may be provided in which the water-swellable element 14 is adhered to the buffer tube 16, either by friction or by mechanically coupling the buffer tube 16 directly to the water-swellable element 14.

In this second aspect, the compositions of buffer tube 16 and water-swellable element 14 may be chosen to promote the coupling of the water-swellable element 14 to a wall of buffer tube 16 through the mechanical interlocking of fibers embedding into the tube wall. Fibrils of the water-swellable element 14 may become embedded in the inner wall of the buffer tube 16, for example, during cooling of the buffer tube. In an embodiment of this second aspect of the cables, the water-swellable element 14 may be made of a material including, for example, polyester fibers and the buffer tube 16 may be made of a material including polyethylene.

According to the second aspect of the cables, the cables include an adhesive material 20 for bonding the optical fibers to the water-swellable material. Adhesive material 20 may be any of the adhesive materials 20 previously identified in connection with FIG. 1.

On the other hand, the cables do not require the presence of the adhesive material 20 for bonding the optical fibers to the water-swellable material.

Figure 4:
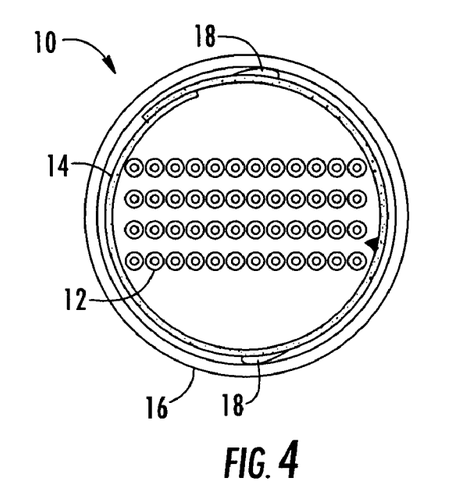
FIG. 4 is a sectional view of an embodiment of a third aspect of the cables.

In this regard, according to an embodiment of a third aspect of the cables, illustrated in FIG. 4, there is provided a buffer tube arrangement 10 in which a curable adhesive material 18 is provided for bonding a water-swellable element 14 to a buffer tube 16, but adhesive material 20 for bonding optical fibers 12 to the water-swellable material 14 is not included.

This third aspect of the cables relies on frictional coupling of the optical fibers (e.g., the fiber bundle) to the water-swellable element in order to couple the fibers through to the buffer tube wall.

Figure 5:
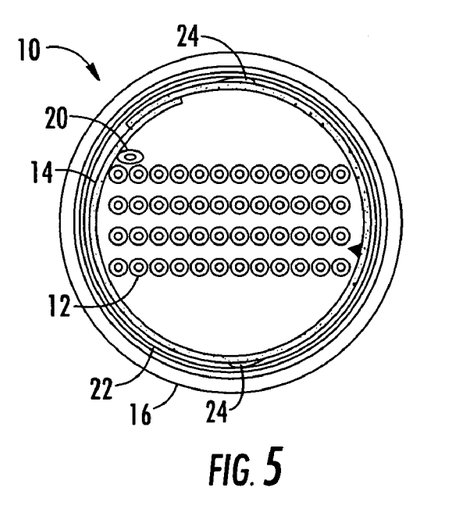
FIG. 5 is a sectional view of an embodiment of a fourth aspect of the cables.

FIG. 5 illustrates an embodiment of yet another aspect (the fourth aspect) of the cables. According to the fourth aspect, the buffer tube arrangement 10 includes a plurality of optical fibers 12 arranged in a bundle (e.g., a ribbon stack), a water-swellable element 14 disposed around the bundle of optical fibers 12, and a buffer tube 16 in which the optical fibers 12 and water-swellable element 14 are enclosed.

As in the first aspect illustrated in FIG. 1, an adhesive material 20 may be used for bonding the bundle of fibers to the water-swellable element 14. Also as in the first aspect, although FIG. 5 illustrates the optical fibers bundled together as a ribbon stack, the optical fibers may alternatively be, for example, loosely disposed or helically wound around each other.

The fourth aspect differs from previous aspects in that a fibrous material 22 is provided between the water-swellable element 14 and the buffer tube 16. For example, a web of fibrous material 22 may be helically wrapped around the water-swellable element containing the optical fibers. An advantage of this aspect is that the water-swellable element may comprise a material of like composition with the buffer tube material, for example polypropylene spun-bonded webs capturing water-swellable powder between two layers, and a polyester spun-bonded web interposed between this water-swellable element and a polypropylene buffer tube prevents the water-swellable element from developing an undesirably high level of bonding with the buffer tube. Again, this arrangement may allow the fiber bundle and water-swellable element to be placed under strain during the buffer tube extrusion process, while the web of fibrous material allows slip between the water-swellable element and the buffer tube during this dynamic process. There may be at least two advantages to utilizing a water-swellable element comprising two layers of web capturing water-swellable powder between. First, the water-swellable particles may be kept away from the optical fibers, reducing the microbending induced by the particles impinging on the optical fibers. Second, little or no loose powder may be encountered when a cable containing such a two-layer water-swellable tape is accessed.

The buffer tube arrangement according to the fourth aspect includes a curable adhesive material 24 for bonding the fibrous material to the water-swellable element. Curable adhesive material 24 may be any of the adhesive materials identified before in connection with curable adhesive material 18 of FIGS. 1, 2, and 4. Curable adhesive 24 may be applied, for example, on the surface of fibrous material 22 between water-swellable element 14 and fibrous material 22 prior to entering the buffer tube extruder, on the surface of water-swellable element 14 between water-swellable element 14 and fibrous material 22 prior to entering the buffer tube extruder, or curable adhesive material 24 may be embedded into water-swellable element 14 and/or fibrous material 22 prior to entering the buffer tube extruder. Curable adhesive material 24 may be applied as a bead or in any of the manners identified before in connection with curable adhesive material 18 of FIGS. 1, 2, and 4.

Fibrous material 22 may be, for example, a fibrous synthetic resin, such as a spun-bonded web or fabric. Fibrous material 22 may include spin-and-calender fibers that have been randomly oriented, pressed flat, and bonded with heat, thereby remaining porous and of a fibrous nature.

The composition of fibrous material 22 is not particularly limited and may include, for example, a polyester. In addition, the compositions of buffer tube 16 and fibrous material 22 may be chosen to promote adherence therebetween through coupling of fibrous material 22 to a wall of buffer tube 16 through the mechanical interlocking of fibers from fibrous material 22 embedding into the wall of buffer tube 16 during the extrusion process of tube 16.

In particular, during the process of extruding the buffer tube, the fibers of the fibrous material 22 may become embedded in the buffer tube so as to mechanically couple the two. During the buffer tube extrusion process, the fibrous material 22 is not bonded to the water-swellable element 14 because adhesive material 24 has yet to be cured. This yields the following advantages.

By using a curable adhesive material 24, which is not yet cured, and thus does not bond fibrous material 22 to water-swellable element 14 during the buffer tube extrusion process, relative movement is permitted between the buffer tube and the optical fibers, so that the fibers will not be subjected to undesirable compressive strain during cooling of the buffer tube. That is, (i) the optical fibers and water-swellable element will sufficiently remain together (remain together in sync, moving at the same rate) during the extrusion process, and (ii) the optical fibers and water-swellable element will move relative to the fibrous material and buffer tube due to the mechanical coupling (embedding) between the fibrous material and the wall of the buffer tube.

In addition, if a thermoplastic adhesive material 20 is used for bonding optical fibers to the water-swellable element 14, the use of a curable adhesive material 24, which is not yet cured, and thus does not bond fibrous material 22 to water-swellable element 14 during the buffer tube extrusion process, will minimize or prevent unwanted shearing of thermoplastic adhesive material 20. In this regard, the use of a curable adhesive material 24, which is not yet cured, and thus does not bond fibrous material 22 to water-swellable element 14 during the buffer tube extrusion process, keeps the optical fibers and water-swellable element sufficiently together (together in sync, moving at the same rate) during the extrusion process. If it were otherwise, and the optical fibers and water-swellable element were permitted to move relative to one another, any adhesive between them, such as adhesive material 20, may be sheared and/or agglomerated into lumps that are undesirable in close proximity to the optical fibers.

According to the fourth aspect of the cables, curing of adhesive material 24 may be designed to take place downstream, e.g., after the buffer tube has cooled to a predetermined degree. Once cured to the predetermined degree, fibrous material 22 will be bonded to the water-swellable element 14, and water-swellable element 14 will thereby be adhered/coupled to buffer tube 16.

Figure 6:
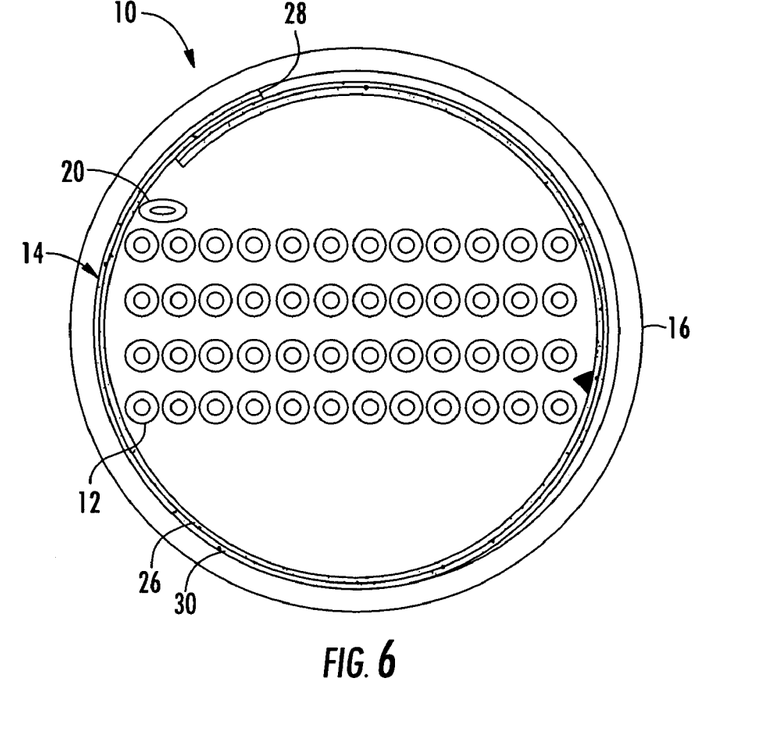
FIG. 6 is a sectional view of an embodiment of a fifth aspect of the cables.

According to an embodiment of a fifth aspect of the cables, illustrated in FIG. 6, a buffer tube arrangement 10 includes a plurality of optical fibers 12, a water-swellable element 14 disposed around the optical fibers 12, and a buffer tube 16 in which the optical fibers 12 and water-swellable element 14 are enclosed.

An adhesive material for bonding the optical fibers 12 to the water-swellable element 14 may be optionally included. The adhesive material may be any of the adhesive materials previously identified in connection with adhesive material 20 of FIGS. 1, 3, and 5.

The fifth aspect differs from previous aspects in that the water-swellable element 14 necessarily includes more than one layer, wherein the composition of an inner layer 26 of the water-swellable element 14 includes a material compatible with a material forming the buffer tube 16. In this regard, a seam 28 of inner layer 26 remains exposed to buffer tube 16 after wrapping of the water-swellable element 14. Accordingly, adhesion between the buffer tube 16 and water-swellable element 14 may be enhanced by the compatibility of inner layer 26 and buffer tube 16. Preferably, the material of the water-swellable element inner layer 26 (and thus the material of seam 28) has a melt profile, e.g., a melting point, which is substantially similar to that of the material forming the buffer tube 16.

As for outer layer 30 of the water-swellable element 14, it may comprise any of the materials previously identified in connection with fibrous material 22 of FIG. 5. The term "outer" as used in connection with the layers of the water-swellable element 14 relates to the layer of the water-swellable element 14 closest to the buffer tube 16.

As an example, in one embodiment (not illustrated), a cable according to the fifth aspect may include a water-swellable element containing two polypropylene inner layers, having water-swellable powder sandwiched between the two inner layers, and a fibrous polyester resin as a third (outer) layer. The buffer tube may also be made of a material containing polypropylene.

A seam of the polypropylene inner layer(s) remains exposed after wrapping of the water-swellable element. Therefore, upon entering the buffer tube extrusion process, the seam will be exposed to the buffer tube being extruded on the water-swellable element.

Accordingly, in addition to the slight amount of adherence achieved through mechanical coupling between the buffer tube and water-swellable element which occurs due to fibrils of the water-swellable element's polyester-containing layer (the outer layer) becoming embedded in the inner wall of the buffer tube during cooling of the buffer tube, the seam provides enhanced adherence between the water-swellable element and the buffer tube through bonding. In the example using a water-swellable element having polypropylene inner layers and a polypropylene-containing buffer tube, the seam of polypropylene from the inner layer(s) may melt into the inside wall of the buffer tube during the buffer tube extrusion process to provide a firm bond upon cooling. Polyester has a higher melting point than polypropylene, such that the polyester-containing outer layer of the water-swellable element may not participate in this type of bonding.

In effect, the seam from the inner layer(s) of the water-swellable element may function as an alternative to curable adhesive materials 18 and 24 employed in the previously described aspects of the cables. However, in certain embodiments, cables according to the fifth aspect may also employ a curable adhesive material for further bonding of the water-swellable element to the buffer tube. The curable adhesive may be any of the curable adhesive materials previously identified in connection with curable adhesive material 18 of FIGS. 1, 2, and 4 and curable adhesive 24 of FIG. 5.

Departures can be made from aspects and embodiments of the cables described herein by those of ordinary skill in the art without departing from the spirit and scope of the invention, which is limited only by the following claims.

What is claimed is:

1. A buffer tube arrangement, comprising:
   a plurality of optical fibers;
   an extruded buffer tube enclosing said optical fibers;
   a water-swellable element disposed between the optical fibers and the extruded buffer tube and enclosing the optical fibers; and
   a curable adhesive material provided on the water-swellable element for bonding the water-swellable element to the buffer tube, the curable adhesive material being cured after the extruded buffer tube has substantially completed its post-extrusion contraction on cooling, thereby adhesively bonding the water-swellable element to the extruded buffer tube in a way that averts subjecting the optical fibers and/or the water-swellable element to unwanted contractive forces caused by the post-extrusion contraction of the extruded buffer tube.

2. The buffer tube arrangement of claim 1, wherein said curable adhesive material comprises a thermally curable material.

3. The buffer tube arrangement of claim 2, wherein said thermally curable material comprises a silicone.

4. The buffer tube arrangement of claim 1, wherein said curable adhesive material comprises a radiation-curable material.

5. The buffer tube arrangement of claim 1, wherein said curable adhesive material comprises a foamed curable adhesive material.

6. The buffer tube arrangement of claim 5, wherein the degree of foaming of said foamed curable adhesive material is from 1% to 95%.

7. The buffer tube arrangement of claim 5, wherein said foamed curable adhesive material fills from 1% to virtually 100% of the free space inside the water-swellable element.

8. The buffer tube arrangement of claim 1, wherein said curable adhesive material is provided as at least one bead.

9. The buffer tube arrangement of claim 8, wherein said at least one bead comprises a continuous bead.

10. The buffer tube arrangement of claim 8, wherein said at least one bead comprises an intermittent bead.

11. The buffer tube arrangement of claim 1, wherein said curable adhesive material is embedded in the water-swellable element.

12. The buffer tube arrangement of claim 1, wherein said optical fibers are bundled as a ribbon stack.

13. The buffer tube arrangement of claim 1, wherein said optical fibers are helically wound around each other.

14. The buffer tube arrangement of claim 1, wherein said water-swellable element is one of a tape or one or more yarns having water-absorbing particles, or a combination of the tape and one or more yarns.

15. The buffer tube arrangement of claim 1, wherein said water-swellable element comprises two layers and a water-swellable powder sandwiched between the two layers.

16. The buffer tube arrangement of claim 1, further comprising an additional adhesive material for bonding the optical fibers to the water-swellable element.

17. The buffer tube arrangement of claim 16, wherein said additional adhesive material is provided on said optical fibers.

18. The buffer tube arrangement of claim 16, wherein said additional adhesive material is provided on said water-swellable element.

19. The buffer tube arrangement of claim 16, wherein said additional adhesive material is provided as at least one bead.

20. The buffer tube arrangement of claim 19, wherein said at least one bead comprises a continuous bead.

21. The buffer tube arrangement of claim 19, wherein said at least one bead comprises an intermittent bead.

22. The buffer tube arrangement of claim 16, wherein said additional adhesive material comprises a thermoplastic adhesive material.

23. The buffer tube arrangement of claim 16, wherein said additional adhesive material comprises a thermally curable material.

24. The buffer tube arrangement of claim 16, wherein said additional adhesive material comprises a silicone.

25. The buffer tube arrangement of claim 16, wherein said additional adhesive material comprises a radiation-curable material.

26. The buffer tube arrangement of claim 16, wherein said additional adhesive material comprises a foamed adhesive material.

27. The buffer tube arrangement of claim 26, wherein the degree of foaming of said foamed adhesive material is from 1% to 95%.

28. The buffer tube arrangement of claim 26, wherein said foamed adhesive material fills from 1% to virtually 100% of the free space inside the water-swellable element.

29. The buffer tube arrangement of claim 1, wherein said buffer tube arrangement does not comprise an adhesive material for bonding the optical fibers to the water-swellable element.

30. The buffer tube arrangement of claim 1, comprising an adhesive bond between the cured adhesive material and the water-swellable element, the adhesive bond minimizing the unwanted contractive forces acting upon the optical fibers and/or the water-swellable element.

31. A method of forming the buffer tube arrangement of claim 1, comprising:
   conveying the plurality of optical fibers;
   providing the water-swellable element at least partially around the optical fibers;
   applying the curable adhesive material to the water-swellable element; and
   extruding the buffer tube around the optical fibers and water-swellable element, wherein said curable adhesive material cures after the extruding to bond the water-swellable element to the buffer tube.

32. A buffer tube arrangement, comprising:
   a plurality of optical fibers;
   an extruded buffer tube enclosing said optical fibers;
   a water-swellable element disposed between the optical fibers and the extruded buffer tube and enclosing the optical fibers;
   a fabric or web of fibrous material disposed between the water-swellable element and the extruded buffer tube, the fibrous material reducing bonding between the water-swellable element and the extruded buffer tube; and
   a curable adhesive material for bonding the fibrous material to the water-swellable element.

33. The buffer tube arrangement of claim 32, wherein said fibrous material comprises a fibrous synthetic resin.

34. The buffer tube arrangement of claim 33, wherein said fibrous synthetic resin comprises a polyester.

35. The buffer tube arrangement of claim 32, wherein said curable adhesive material is provided on said water-swellable element.

36. The buffer tube arrangement of claim 32, wherein said curable adhesive material is embedded in said water-swellable element.

37. The buffer tube arrangement of claim 32, wherein said curable adhesive material is provided on said fibrous material.

38. The buffer tube arrangement of claim 32, wherein said curable adhesive material is embedded in said fibrous material.

39. The buffer tube arrangement of claim 32, wherein said curable adhesive material comprises a thermally curable material.

40. The buffer tube arrangement of claim 39, wherein said thermally curable material comprises a silicone.

41. The buffer tube arrangement of claim 32, wherein said curable adhesive material comprises a radiation-curable material.

42. The buffer tube arrangement of claim 32, wherein said curable adhesive material comprises a foamed curable adhesive material.

43. The buffer tube arrangement of claim 32, wherein said optical fibers are bundled as a ribbon stack.

44. The buffer tube arrangement of claim 32, wherein said optical fibers are helically wound around each other.

45. The buffer tube arrangement of claim 32, wherein said water-swellable element is one of a tape or one or more yarns having water-absorbing particles, or a combination of the tape and one or more yarns.

46. The buffer tube arrangement of claim 32, wherein said water-swellable element comprises two layers and a water-swellable powder sandwiched between the two layers.

47. The buffer tube arrangement of claim 32, further comprising an additional adhesive material for bonding the optical fibers to the water-swellable element.

48. The buffer tube arrangement of claim 47, wherein said additional adhesive material is provided on said optical fibers.

49. The buffer tube arrangement of claim 47, wherein said additional adhesive material is provided on the water-swellable tape.

50. The buffer tube arrangement of claim 47, wherein said additional adhesive material is provided as at least one bead.

51. The buffer tube arrangement of claim 50, wherein said at least one bead comprises a continuous bead.

52. The buffer tube arrangement of claim 50, wherein said at least one bead comprises an intermittent bead.

53. The buffer tube arrangement of claim 47, wherein said additional adhesive material comprises a curable adhesive material.

54. The buffer tube arrangement of claim 47, wherein said additional adhesive material comprises a thermally curable material.

55. The buffer tube arrangement of claim 47, wherein said additional adhesive material comprises a silicone.

56. The buffer tube arrangement of claim 47, wherein said additional adhesive material comprises a radiation-curable material.

57. The buffer tube arrangement of claim 47, wherein said additional adhesive material comprises a foamed adhesive material.

58. The buffer tube arrangement of claim 57, wherein the degree of foaming of said foamed adhesive material is from 1% to 95%.

59. The buffer tube arrangement of claim 57, wherein said foamed adhesive material fills from 1% to virtually 100% of the free space inside the water-swellable element.

60. The buffer tube arrangement of claim 32, wherein said buffer tube arrangement does not comprise an adhesive material for bonding the optical fibers to the water-swellable element.

61. The buffer tube arrangement of claim 32, wherein said curable adhesive material has been cured, and said cured adhesive material bonds said water-swellable element to the fibrous material.

62. A method of forming the buffer tube arrangement of claim 32, comprising:
   conveying the plurality of optical fibers;
   providing the water-swellable element at least partially around the optical fibers;
   applying the curable adhesive material to the water-swellable element;
   providing the fibrous material at least partially around the water-swellable element; and
   extruding the buffer tube around the optical fibers, the water-swellable element, and the fibrous material, wherein said curable adhesive material cures after the extruding to bond the water-swellable element to the fibrous material.

63. A buffer tube arrangement, comprising:
   a plurality of optical fibers;
   an extruded buffer tube enclosing said optical fibers; and a water-swellable element disposed between the optical fibers and the buffer tube and enclosing the optical fibers, wherein said water-swellable element comprises (i) an outer layer and (ii) at least one inner layer possessing a melt profile that is substantially similar to that of the extruded buffer tube, and wherein a seam of at least one inner layer of said water-swellable element is exposed to said buffer tube for bonding the water-swellable element to the buffer tube.

64. The buffer tube arrangement of claim 63, wherein said buffer tube arrangement does not comprise an adhesive material for bonding the water-swellable element to the buffer tube.

65. The buffer tube arrangement of claim 63, wherein said water-swellable element comprises the outer layer, two inner layers, and a water-swellable powder sandwiched between the two inner layers.

66. The buffer tube arrangement of claim 63, wherein each of the inner layer and the buffer tube independently comprises a polypropylene, and the outer layer comprises a fibrous synthetic resin.

67. The buffer tube arrangement of claim 66, wherein the fibrous synthetic resin comprises a polyester.

68. The buffer tube arrangement of claim 63, wherein said optical fibers are bundled as a ribbon stack.

69. The buffer tube arrangement of claim 63, wherein said optical fibers are helically wound around each other.

70. The buffer tube arrangement of claim 63, further comprising an adhesive material for bonding the optical fibers to the water-swellable element.

71. The buffer tube arrangement of claim 70, wherein said adhesive material is provided on said optical fibers.

72. The buffer tube arrangement of claim 70, wherein said adhesive material is provided on said water-swellable element.

73. The buffer tube arrangement of claim 70, wherein said adhesive material is provided as at least one bead.

74. The buffer tube arrangement of claim 73, wherein said at least one bead comprises a continuous bead.

75. The buffer tube arrangement of claim 73, wherein said at least one bead comprises an intermittent bead.

76. The buffer tube arrangement of claim 70, wherein said adhesive material comprises a curable adhesive material.

77. The buffer tube arrangement of claim 70, wherein said adhesive material comprises a thermally curable material.

78. The buffer tube arrangement of claim 70, wherein said adhesive material comprises a silicone.

79. The buffer tube arrangement of claim 70, wherein said adhesive material comprises a radiation-curable material.

80. The buffer tube arrangement of claim 70, wherein said adhesive material comprises a foamed adhesive material.

81. The buffer tube arrangement of claim 80, wherein the degree of foaming of said foamed adhesive material is from 1% to 95%.

82. The buffer tube arrangement of claim 80, wherein said foamed adhesive material fills from 1% to virtually 100% of the free space inside the water-swellable element.

83. The buffer tube arrangement of claim 63, wherein said buffer tube arrangement does not comprise an adhesive material for bonding the optical fibers to the water-swellable element.

84. A method of forming the buffer tube arrangement of claim 63, comprising:
    conveying the plurality of optical fibers;
    providing the water-swellable element at least partially around the optical fibers; and
    extruding the buffer tube around the optical fibers and the water-swellable element, wherein said water-swellable element has been provided at least partially around the optical fibers such that a seam of the inner layer of said water-swellable element remains exposed to said buffer tube for bonding the water-swellable element to the buffer tube.

* * * * *